US008242215B2

(12) United States Patent
Hund et al.

(10) Patent No.: US 8,242,215 B2
(45) Date of Patent: Aug. 14, 2012

(54) CATIONIC COPOLYMERS DERIVED FROM ACRYLAMIDES AND USE THEREOF

(75) Inventors: René Hund, Villars (FR); Christian Jehn-Rendu, Eppelheim (DE)

(73) Assignee: S.P.C.M. SA, Andrezieux Boutheon (FR)

( * ) Notice: Subject to any disclaimer, the term of this patent is extended or adjusted under 35 U.S.C. 154(b) by 252 days.

(21) Appl. No.: 12/449,626

(22) PCT Filed: Feb. 19, 2008

(86) PCT No.: PCT/FR2008/050277
§ 371 (c)(1),
(2), (4) Date: Aug. 18, 2009

(87) PCT Pub. No.: WO2008/113934
PCT Pub. Date: Sep. 25, 2008

(65) Prior Publication Data
US 2010/0326614 A1   Dec. 30, 2010

(30) Foreign Application Priority Data

Feb. 19, 2007  (FR) ..................................... 07 53347
Mar. 12, 2007  (FR) ..................................... 07 53770

(51) Int. Cl.
*C08F 16/00*  (2006.01)

(52) U.S. Cl. ................. 525/328.2; 525/328.4; 525/329.4
(58) Field of Classification Search ............... 525/328.2, 525/328.4, 329.4
See application file for complete search history.

(56) References Cited

U.S. PATENT DOCUMENTS

| 579,222 A | 3/1897 | Craddock |
| 2004/0118540 A1 | 6/2004 | Garnier et al. |
| 2008/0196851 A1 * | 8/2008 | Hund et al. ................ 162/164.6 |

FOREIGN PATENT DOCUMENTS

| EP | 0 377 313 A2 | 7/1990 |
| FR | 1.437.807 A | 5/1966 |
| FR | 2 880 901 A1 | 7/2006 |
| WO | WO 2006/075115 A2 | 7/2006 |

* cited by examiner

*Primary Examiner* — Edward Cain
(74) *Attorney, Agent, or Firm* — Heslin Rothenberg Farley & Mesiti P.C.

(57) ABSTRACT

A cationic copolymers of acrylamide obtained by the Hofmann rearrangement, using an alkali and/or alkaline earth hydroxide and an alkali and/or alkaline earth hypohalide, are provided. The copolymers can be used as strengthening agents for paper and/or coagulants. The copolymers have a desalination coefficient (Cd) higher than 0.6, higher than 0.65, or higher than 0.7.

23 Claims, No Drawings

CATIONIC COPOLYMERS DERIVED FROM ACRYLAMIDES AND USE THEREOF

This is a National Phase Application filed under 35 U.S.C. 371 as a national stage of PCT/FR2008/050277, filed on Feb. 19, 2008, an application claiming the benefit of French Patent Application No. 0753347, filed on Feb. 19, 2007, and French Patent Application No. 0753770, filed on Mar. 12, 2007, the entire content of each of which is hereby incorporated by reference in its entirety.

The invention relates to cationic copolymers of acrylamide obtained by the Hofmann rearrangement, using an alkali and/or alkaline earth hydroxide and an alkali and/or alkaline earth hypohalide, and the use of these copolymers mainly as strengthening agents for paper and/or coagulants.

More precisely, according to the invention, the cationic copolymers of acrylamide are organic polymers characterized in that they are obtained:

by the Hofmann rearrangement in aqueous solution, and in that they comprise a reduced salt content characterized by a desalination coefficient (Cd) higher than 0.6, preferably higher than 0.65, advantageously higher than 0.7, with Cd equal to:

$$\frac{\text{Real polymeric active matter (in weight \%)} \times \text{Polymer filler density}}{\text{Conductivity of the solution containing 9\% of active matter}}$$

The examples of cationic polymers of acrylamide obtained in the prior art are of various types: as a rule, they are copolymers based on acrylamide and cationic monomers, which may also be polymers called Mannich polymers (the acrylamide polymer reacts with formaldehyde and a secondary amine and is then quaternized), glyoxal polymers or acrylamide polymers on which the Hofmann rearrangement is carried out.

Among all these polymers, only those obtained by the Hofmann rearrangement have specific and unshared properties in terms of cationic filler density.

Hofmann Rearrangement

This reaction, discovered by Hofmann in the late 19$^{th}$ century, serves to convert an amide function to a primary amine function by removing one carbon atom. The reaction mechanism is described below.

In the presence of a base (e.g.: NaOH), a proton is stripped from the amide.

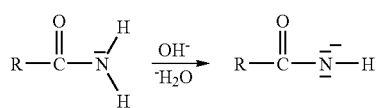

The amidate ion formed then reacts with the active chlorine ($Cl_2$) of the hypochlorite (e.g.: NaClO which is in equilibrium: $2NaOH+Cl_2 \leftrightarrow NaOCl+NaCl+H_2O$) to yield a N-chloramide. The base (NaOH) strips a proton from the chloramide to form an anion. The anion loses a chloride ion to form a nitrene which undergoes a transposition to isocyanate.

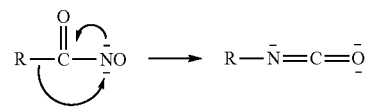

By reaction between the hydroxide ion and the isocyanate, a carbamate is formed.

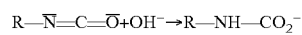

After decarboxylation (removal of $CO_2$ in the presence of acid, e.g. HCl) from the carbamate, a primary amine is obtained in the form of an acid salt.

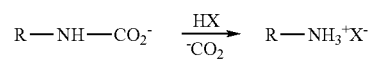

It is important to note that, due to the reactants required, a very large quantity of sodium salt is also systematically produced.

In practice, for each degraded amide function, 4 molecules of sodium hydroxide are required. This means that for each primary amine function obtained, 4 molecules of sodium salt (e.g. sodium chloride) are produced.

This also applies to the Hofmann rearrangement on an acrylamide copolymer, which has been a well known and exemplary reaction for many years, in particular in patent application U.S. Pat. No. 579,222 dating from 1956.

For the conversion of all or part of the amide functions of an acrylamide copolymer to an amine function, 2 main factors are involved (expressed in molar ratios). These are: —Alpha= (alkali and/or alkaline earth hypohalide/(meth)acrylamide) and —Beta=(alkali and/or alkaline earth hydroxide/alkali and/or alkaline earth hypohalide).

The polymers obtained by the Hofmann rearrangement are used in particular as strengthening agents in papermaking processes. In general, it is known that to be effective as a strengthening agent, the (co)polymers used must be as cationic as possible and therefore have a high degree of degradation. Owing to their intrinsic properties (stabilization, cationization, complexation), the polymers of the invention may also be advantageous in a wide variety of applications. Mention can be made in a non-limiting manner of: water treatment (drinking or wastewater), coagulation/flocculation techniques, the mining industry, the cosmetics and detergent industry, the textile industry.

In fact, according to the degree of Alpha degradation, variations in cationicity may be generated, according to the quantity of amine functions produced on the carbon skeleton of the (co)polymer.

Accordingly, to degrade by Hofmann rearrangement X moles % of acrylamide functions of an acrylamide homopolymer to a primary amine function, the dry weight of sodium halide formed is equal to "X" multiplied by the "number of moles of acrylamide" multiplied by "4" and multiplied by the "molecular weight of the salt", with "the number of moles of acrylamide"=(dry weight of polymer/71), where 71 is the molecular weight of the acrylamide.

Thus, for a mass of 100 grams of acrylamide homopolymer, a Hofmann rearrangement produces the following masses of salt:

| X (=Alpha) | NaCl (in grams) (molecular weight = 58.5) |
|---|---|
| 0.5 or 50% | 164.8 |
| 0.7 | 230 |
| 1 | 329.6 |

This very high salt content (e.g. alpha 1 comprises 3 times more salt than active matter) in the polymeric solution is not neutral and may, in certain cases, cause problems when, for example, the polymer is used in closed circuit. This may be the case in particular in the paper industry, in which the resulting increase in "process water" conductivity may have a strong impact on the fabrication process, which is highly sensitive to the least change in operating conditions. Such a variation may, for example, cause deactivation of the retention polymer and thus a drop in filler retention.

Furthermore, the inherent instability of the polymers obtained by the Hofmann rearrangement on a (co)polymer of acrylamide (they rapidly lose a high proportion of their cationicity), made the product impractical from the industrial standpoint. A person skilled in the art was accordingly dissuaded from using these products in paper manufacturing processes in particular.

Until recently, only very large scale processes involving a Hofmann arrangement plant in situ (EP 377313) or methods employing another polymer (based of the N-vinylformamide (co)polymer type followed by a hydrolysis) itself relatively costly (US 2004/118540), had been set up.

It was necessary to wait until early 2005 and patent WO2006075115 to the applicant to find a viable industrial solution proposed. The invention therein is partly characterized by the fact that the Hofmann rearrangement product claimed is an organic polymer produced in a concentration higher than 3.5% by weight and preferably higher than 4.5%. Even if the dry strength performance is sharply improved, the polymers produced remain unstable over time.

The Applicant has observed that very surprisingly, an optimization of the desalination coefficient (Cd) serves to impart satisfactory stability to the copolymers of the invention.

More precisely, the Applicant has found that a cationic copolymer of acrylamide obtained by the Hofmann rearrangement having a high concentration (higher than 8% by weight), a high cationicity, and a reduced alkali salt content (characterized by its desalination coefficient) served to improve its stability and its application performance, particularly in terms of dry strength, coagulation, and the capacity to lower chemical oxygen demand (COD).

As a reminder, chemical oxygen demand (COD) is a measurement that serves to assess the organic or inorganic matter concentration, dissolved or in suspension in the water, through the quantity of oxygen required for their total chemical oxidation.

DESCRIPTION OF THE INVENTION

The applicant has found and developed cationic copolymers of acrylamide obtained by the Hofmann rearrangement, using an alkali and/or alkaline earth hydroxide and an alkali and/or alkaline earth hypohalide, and the use of these copolymers mainly as strengthening for paper and/or coagulants, characterized in that they are obtained in aqueous solution and in that they comprise a reduced salt content characterized by a desalination coefficient (Cd) higher than 0.6, preferably higher than 0.65, advantageously higher than 0.7, with Cd equal to:

$$\frac{\text{Real polymeric active matter (in weight \%)} \times \text{Polymer filler density}}{\text{Conductivity of the solution containing 9\% of active matter}}$$

This selection of a Hofmann rearrangement product obtained in aqueous solution on a base copolymer comprising:

at least one non-ionic monomer selected from the group comprising acrylamide (and/or methacrylamide), N,N dimethylacrylamide and/or acrylonitrile, and at least one unsaturated cationic ethylenic comonomer and/or a non-ionic comonomer which is not acrylamide (and/or methacrylamide), N,N dimethylacrylamide and/or acrylonitrile, serves surprisingly to reach a performance level hitherto unequaled by the same (co)polymers, in particular in the paper application and especially for the dry strength.

According to another feature, the Alpha coefficient (corresponding to the percentage of acrylamide functions degraded to amine functions) that is the ratio of alkali and/or alkaline earth hypohalide/non-ionic monomer selected from the group comprising acrylamide (and/or methacrylamide), N,N dimethylacrylamide and/or acrylonitrile used for the preparation of the polymers of the invention is higher than 0.5, or even higher than 0.7 (e.g. >70%), preferably higher than 0.9 and advantageously equal to one. In the case in which the reactants used are sodium chloride and hypochlorite, it is important to note that on the finished product, Alpha may be estimated relatively accurately by a simple determination of sodium chloride, since the sodium of the hypochlorite (molecular weight: 74.5 g/mol) accounts for ¼ of the total sodium.

Whereas these products are known in the prior art for their instability and/or their low concentration, it was unreasonable to presume that a joint action on the type of base polymer (here a copolymer) and on the limited proportion of salt with regard to the cationic copolymers of acrylamide present in the solution, would not only affect the performance of the polymers obtained according to the invention, but, moreover, would serve to achieve better results than the same polymers of the prior art not having these specificities.

The copolymer obtained according to the invention can be used successfully for fabricating paper and packing cardboard, coated support papers, all types of paper, cardboard or similar requiring the use of a cationic polymer and as a coagulant.

The cationic copolymers of acrylamide of the invention serve in particular to obtain a very high burst and tensile strength, without any negative side effect.

According to another feature, the Hofmann rearrangement product is produced in a concentration higher than 8% by weight, preferably higher than 10% by weight, advantageously higher than 12% by weight.

Similarly, the copolymer of the invention has a cationic filler density higher than 3 meq/g, preferably higher than 5 meq/g.

The Cationic (Co)Polymer of Acrylamide

It is obtained by the Hofmann rearrangement on a base copolymer.

The "Base" Copolymer

In practice, the base polymer used consists of:
at least one non-ionic monomer selected from the group comprising acrylamide (and/or methacrylamide), N,N dimethylacrylamide and/or acrylonitrile, preferably acrylamide, advantageously at least 5 moles % of the said monomer, preferably at least 50 moles % of the said monomer, in practice about 70 moles % of the said monomer, and at least:
an unsaturated cationic ethylenic monomer, selected preferably from the group comprising monomers of the dialkylaminoalkyl(meth)acrylamide, diallylamine, methyldiallylamine type and quaternary ammonium salts thereof, or of acids. Mention can be made in particular of dimethyldiallylammonium chloride (DADMAC), acrylamidopropyltrimethylammonium chloride (APTAC), methacrylamidopropyltrimethylammonium chloride (MAPTAC), and/or a non-ionic monomer preferably selected from the group comprising N-vinyl acetamide, N-vinyl formamide, N-vinylpyrrolidone and/or vinyl acetate.

Optionally, the base polymer may also be very slightly amphoteric (concentration lower than 5 moles %) and for example comprise anionic fillers carried by monomers of the acid or anhydride type such as, for example, (meth)acrylic acid, acrylamidomethylpropane sulphonic acid, itaconic acid, maleic anhydride, maleic acid, methallyl sulphonic acid, vinyl-sulphonic acid and salts thereof.

In an advantageous embodiment, the base polymer contains 70 moles % of acrylamide and 30% of DADMAC.

It is important to note that, in combination with these monomers, it is also possible to use monomers insoluble in water, such as acrylic, allyl or vinyl monomers comprising a hydrophobic group. During their use, these monomers are employed in very small quantities, lower than 20 moles %, preferably lower than 10 moles %, and they are preferably selected from the group comprising derivatives of acrylamide such as N-alkylacrylamide, for example N-tert-butylacrylamide, octylacrylamide and also N,N-dialkylacrylamides such as N,N-dihexylacrylamide, and derivatives of acrylic acid such as alkyl acrylates and methacrylates.

In a manner known per se, the base copolymer may also be branched. As we know, a branched polymer is a polymer which has branches or groups on the main chain, roughly arranged in a plane.

The branching can preferably be carried out during (or optionally after) the polymerization, in the presence of a branching agent and optionally a transfer agent. A non-limiting list of branching agents is given below: methylene bisacrylamide (MBA), ethylene glycol di-acrylate, polyethylene glycol dimethacrylate, diacrylamide, cyanomethylacrylate, vinyloxyethylacrylate or methacrylate, triallylamine, formaldehyde, glyoxal, compounds of the glycidylether type such as ethyleneglycol diglycidylether, or epoxies or any other means for branching well known to a person skilled in the art.

In practice, the branching agent is methylene bis acrylamide (MBA) introduced advantageously at the rate of five to fifty thousand (5 to 50 000) parts per million by weight, preferably 5 to 1000. Advantageously, the branching agent is methylene bis acrylamide (MBA).

A non-limiting list of transfer agents is given below: isopropyl alcohol, sodium hypophosphite, mercaptoethanol, etc.

A person skilled in the art knows how to select the best combination according to his own knowledge and the present description, and also the examples that follow.

The copolymer serving as a base for the Hofmann rearrangement does not require the development of any particular polymerization method. The main polymerization techniques, well known to a person skilled in the art and usable are: precipitation polymerization, emulsion polymerization (aqueous or reverse) followed or not by a distillation and/or spray drying step, and suspension polymerization or solution polymerization, these two techniques being preferred.

This base is characterized in that it has a molecular weight higher than 5000 g/mol and without any upper limit.

It is also possible to add to the base copolymer solution, before or during the Hofmann rearrangement, certain additives which are capable of reacting on the isocyanate functions of the polymer generated during degradation. In general, these are molecules containing nucleophilic chemical functions such as hydroxyl, amine functions, etc. By way of example, the additives in question may therefore be of the family of alcohols, polyols, (e.g. starch), polyamines, polyethylene imines, etc.

In the context of the present invention, it is also possible to propose cationic copolymers of acrylamide obtained by the Hofmann rearrangement in the form of a mixture with one or more other synthetic polymers having higher molecular weights and preferably a non-ionic or cationic filler.

The Hofmann Rearrangement on the Base Polymer

The Hofmann rearrangement requires the conversion of the amide functions to amine functions by involving 2 main factors (expressed in molar ratios):

Alpha=(alkali and/or alkaline earth hypohalide/(meth) acrylamide)

Beta=(alkali and/or alkaline earth hydroxide/alkali and/or alkaline earth hypohalide).

Based on a solution of base copolymer (acrylamide copolymer and derivatives) having a concentration between 10 and 40% by weight, preferably between 20 and 40%, the molar quantity of total (meth)acrylamide function is determined. The desired alpha degradation level is selected (which corresponds to the degree of amine function desired), which serves to determine the dry quantity of alkaline and/or alkaline earth hypohalide and then the beta coefficient, which serves to determine the dry quantity of alkali and/or alkaline earth hydroxide.

A solution of alkali and/or alkaline earth hypohalide and alkali and/or alkaline earth hydroxide is prepared from the alpha and beta ratios. Conventionally, the reactants used are sodium hypochlorite and caustic soda (sodium hydroxide).

In order to stabilise the amine functions which are produced, it is possible optionally to add, to the reactor containing the base polymer, a (or optionally a plurality of) quaternary ammonium derivatives such as described in patent JP 57077398 and well known to a person skilled in the art, who is in fact concerned to prevent the reaction between the amine functions and the residual amide functions. It may also be observed that the addition of these agents can be carried out separately or simultaneously, in a mixture or not, in any order of introduction, and at one or more injection points.

Increase in the Desalination Coefficient (Cd)

This operation consists in removing a portion of the solvent (here water) in order to enrich the solution with dissolved substances and to continue this concentration until the solution is saturated with salt. It is only at this stage that a continued increase in concentration will have the effect of reducing the proportion of salt present in the solution.

The present invention is characterized in that the cationic copolymers of an acrylamide obtained by the Hofmann rearrangement in aqueous solution have a desalination coefficient (Cd) higher than 0.6, preferably higher than 0.65, advantageously higher than 0.7, with Cd equal to:

$$\frac{\text{Real polymeric active matter (in weight \%)} \times \text{Polymer filler density}}{\text{Conductivity of the solution containing 9\% of active matter}}$$

It may be noted that this coefficient binds the active matter, the degree of degradation and the salinity of the solution (expressed as conductivity).

A person skilled in the art will know, according to his own knowledge and the present description, how to select the most appropriate separative technique enabling him to satisfy these obligations. Among the conventional techniques, mention can be made of distillation, evaporation, and techniques using membranes such as, for example, electrodialysis, reverse osmosis and ultrafiltration.

Furthermore, although prepared in solution, the polymers of the invention may also be proposed in solid form. Under these conditions, the solid form not only contains the copolymer, but also a proportion of salt obtained after the Hofmann rearrangement. In practice, they are obtained inter alia by methods consisting in drying the active matter of the above-mentioned solution. The main isolation techniques then used are those of spray drying (which consists in creating a cloud of fine droplets in a hot gas stream for a controlled period), drum drying, fluidized bed dryers, etc.

As already stated, the copolymers of the invention have a more specific application in papermaking processes for their property of dry strength, coagulation, and their capacity to reduce the chemical oxygen demand (COD).

Accordingly, the invention also relates to a method for fabricating a sheet of paper and/or cardboard and similar, whereby, before the formation of the said sheet, at least two dry strength agents are added to the fibrous suspension, separately or in a mixture, in any order of introduction, at one or more injection points, respectively:

- a first agent corresponding to the copolymer of the present invention,
- and a second agent corresponding to a (co)polymer having an anionic filler density higher than 0.1 meq/g.

According to the method, the first and second agents are introduced into the fibrous suspension at the rate of 0.01 to 2% each, by weight of active polymer matter of the dry weight of the fibrous suspension.

In practice, the anionic resin is a water-soluble organic polymer having an anionic filler density higher than 0.1 meq/g, characterized in that it is obtained from:

- 1 to 100 molar % of at least one monomer having an anionic filler,
- and 0 to 99 molar % of at least one monomer having a neutral or cationic filler.

A non-limiting list of monomers which can be used is given below:

a) anionic monomers having a carboxylic function (e.g. acrylic acid, methacrylic acid, and salts thereof), having a sulphonic acid function (e.g.: 2-acrylamido-2-methylpropane sulphonic acid (AMPS), vinyl sulphonic acid, methallyl sulphonic acid and salts thereof), b) non-ionic monomers: acrylamide, methacrylamide, N,N dimethylacrylamide, N-vinyl pyrrolidone, N-vinyl acetamide, N-vinyl formamide, vinylacetate, acrylate esters, allyl alcohol, and/or cationic monomers selected from the group comprising in particular but in a non-limiting manner dimethylaminoethyl acrylate (ADAME) and/or dimethylaminoethyl methacrylate (MADAME), quaternized or salified, dimethyldiallylammonium chloride (DADMAC), acrylamido propyltrimethyl ammonium chloride (APTAC) and/or methacrylamido propyltrimethyl ammonium chloride (MAPTAC).

The anionic resin does not require the development of a particular polymerization method. It can be obtained by all polymerization techniques well known to a person skilled in the art: gel polymerisation, precipitation polymerization, emulsion polymerization (aqueous or reverse) followed or not by a distillation and/or spray drying step, and suspension polymerization or solution polymerization.

According to a particular and preferred embodiment, the (co)polymer having an anionic filler density higher than 0.1 meq/g is branched. It is obtained by the addition, before, during and/or after the polymerization, of a branching agent in the presence or not of a transfer agent. When the branching agent is glyoxal, it is added after polymerization.

A non-limiting list of branching agents is given below: methylene bisacrylamide (MBA), ethylene glycol di-acrylate, polyethylene glycol dimethacrylate, diacrylamide, cyanomethylacrylate, vinyloxyethylacrylate or methacrylate, triallylamine, formaldehyde, glyoxal, compounds of the glycidylether type such as ethyleneglycol diglycidylether, or epoxies or any other means for branching well known to a person skilled in the art.

A non-limiting list of transfer agents is given below: isopropyl alcohol, sodium hypophosphite, mercaptoethanol, etc.

In practice, the second dry strength agent is introduced, in an absolutely preferred manner, in the suspension at a rate of 100 g/t to 20 000 g/t by weight of active matter (polymer) of the dry weight of the fibrous suspension, preferably 500 g/t to 5000 g/t.

The following examples illustrate the invention but without limiting its scope.

EXAMPLES

Cationic (Co)Polymers of Acrylamide

The product was obtained by a Hofmann rearrangement of an acrylamide homopolymer or an acrylamide copolymer and dimethyldiallyl ammonium chloride (DADMAC) or N-vinylpyrrolidone (NVP) at a temperature of 10° C. using sodium hypochlorite, sodium hydroxide and hydrochloric acid (used as reactants according to the method described above) (optionally, cf. A2, in the presence, of native starch: 4.5% by weight) followed by distillation. The base polymers were polymerized in aqueous solution in 25% concentration all having the same viscosity (3000 cps). A direct correlation exists between the viscosity of this base solution and the molecular weigh of the polymer.

In the examples below, the following polymers were prepared:

| Cationic (co)polymer of acrylamide | Composition | Real polymeric active matter (in weight %) | Filler density (meq/g of polymer) | Conductivity of the solution in 9% concentration of active matter (mS/cm) | Desalination coefficient (Cd) |
|---|---|---|---|---|---|
| Ce1 | AM | 7.5 | 7 | 204 | 0.25 |
| Ce2 | AM | 4.8 | 9.3 | 208 | 0.22 |
| C3 | AM/DADMAC | 15 | 9.2 | 109 | 1.27 |
| C4 | AM/DADMAC + starch | 25 | 5.8 | 72 | 2.01 |
| C5 | AM/NVP | 15 | 6.8 | 101 | 1.01 |

AM = acrylamide homopolymer
AM/DADMAC = acrylamide/DADMAC copolymer (70/30 mol %)
AM/NVP = acrylamide/N-vinylpyrrolidone copolymer (70/30 mol %)
Ce: counter-examples Rmq: In order to measure the conductivity of the solutions in the concentration of 9% by weight of active matter, the solutions were either diluted or concentrated by distillation.

Analytical Methods a) Measurement of Real Active Matter:

In the context of the examples of the invention, this measurement was unnecessary because the polymer concentrations can be estimated directly from the operating conditions. Despite this, the value can also be measured using a purification method to isolate the polymeric material from the salt.

Conventionally, to obtain a purified form of polymer in solution, use is either made up of solvent precipitation techniques, well known to a person skilled in the art, or purification by dialysis. The latter principle consists in separating two solutions (here polymeric and saline) by a porous semi-permeable membrane (pore diameter is about one micron [μm], identical and known), generally in the form of a dialysis tubing. By osmosis effect and molecular agitation, the small molecules (NaCl) cross the membrane, while the large molecules (polymer) are retained in the dialysis tubing. Followed by a dry extract, the dialysis then serves to accurately determine the cationic polymer concentration in the solution.

b) Measurement of Polymer Filler Density:

A solution containing 5 g/l of cationic (co)polymer of acrylamide obtained according to the invention is determined with an anionic polymer (potassium polyvinyl sulphate=PVSK) in the presence of a colour indicator (toluidine blue).

Measurement Method:

A solution containing 5 g/l of polymer is first prepared. Based on the theoretical active matter of the liquid, the dilution is prepared in order to obtain a final volume of 200 ml. The solution is homogenized with the magnetic stirrer.

When the stock solution is uniform, weigh 1 g thereof in a 200 ml beaker and make up to 100 ml with deionized water. Shake to make the solution uniform. Add a few drops of hydrochloric acid with stirring, in order to obtain a pH below 4. Then add 2 or 3 drops of colour indicator and determine the solution with PVSK N/400 (from Wako with a known factor f).

The colour changes from blue to violet, the end point is considered as reached when the violet colour persists for a few seconds.

The volume obtained in ml is denoted V.

The cationic filler in meq/g is obtained as follows:

$$E = \frac{V \times 10^{-3}}{5 \times 10^{-3}} \times \frac{1}{400} \times f(eq/g)$$

$$E = \frac{V}{2} \times f(meq/g).$$

c) Conductivity Measurement:

An anionic solution is conductive: the presence of ions ensures the conductive character of the solution. Conductivity is characteristic of the solution. It depends on the concentration and type of ions making it up, and on the temperature. The conductivity values of the invention were measured by an Orion conductometer (model 120) at a temperature of 20° C., and are expressed in milli-siemens per cm (mS/cm).

It is important to note that for each of the polymers exemplified (with the exception of polymer Ce1: Alpha=0.7), the operating conditions in terms of sodium hypochlorite, sodium hydroxide and hydrochloric acid are adjusted and optimised so that all the amide functions carried by the polymer are degraded by the Hofmann rearrangement to amine functions.

Owing to their specificity associated with their high cationic filler density, the polymers of the invention are particularly advantageous during their use as strengthening agents for paper. This is why it was decided to test their properties in terms of effectiveness in this particular application.

Test Procedure for Polymer Properties

A. Stability Test by Accelerated Artificial Aging:

The instability of the cationic or amphoteric copolymers of acrylamide obtained by the Hofmann rearrangement is usually characterized by a progressive gelling of the solution or at least a considerable thickening thereof during its aging.

An effective stability test consists in measuring the variations in viscosity occurring in a sample of product placed for 7 days at 50° C., the high temperature having the effect of accelerating the aging and therefore of decreasing the test time, which would be several weeks at ambient temperature.

During this test, the viscosities are measured before and after aging. When the difference is greater than 30%, the polymer tested is considered as unstable.

| Cationic (co)polymer acrylamide | Composition | Difference in bulk viscosity (in %) | Conclusion |
|---|---|---|---|
| Ce1 | AM | 330 | Unstable |
| Ce2 | AM | 45 | Unstable |
| C3 | AM/DADMAC | 19 | Stable |
| C4 | AM/DADMAC + starch | 10 | Stable |
| C5 | AM/NVP | 22 | Stable |

B. Application Test:

Sheets of paper were prepared with an automatic dynamic sheet machine. The pulp was first prepared by disintegrating 90 grams of virgin craft fibres for 30 minutes in 2 liters of hot water. The slurry obtained was then diluted to a total volume of 9 liters. Once the consistency was accurately measured, the necessary quantity of this slurry was taken in order to finally obtain a sheet with a basis weight of 60 g/m$^2$.

The slurry was then introduced into the tray of the dynamic sheet machine, diluted to a consistency of 0.32% and moderately stirred with a mechanical stirrer in order to homogenize the fibrous suspension.

In manual mode, the slurry was pumped to the nozzle level in order to prime the circuit.

A blotting paper and the forming fabric were placed in the bowl of the dynamic sheet machine before starting the rotation of the bowl at 900 m/min and constructing the waterwall. The various dry strength agents were then introduced into the stirred fibrous suspension with a contact time of 30 seconds and for each polymer. The sheet was then prepared (in automatic mode) by 22 round trips of the nozzle projecting the slurry into the waterwall. Once the water was drained and the automatic sequence terminated, the forming fabric with the fibre network moved from the bowl of the dynamic sheet machine and was placed on the table. A dry blotting paper was placed on the side of the pad of wet fibres and pressed once with a roller. The combination was then overturned and the fabric delicately separated from the fibrous pad. A second dry blotting paper was placed and the sheet (between the two blotting papers) was pressed once under a press delivering 4 bar and then dried on a stretch dryer for 9 minutes at 107° C. The two blotting papers were then removed and the sheet stored overnight in a room with controlled humidity and temperature (50% relative humidity and 23° C.). The dry and wet strength properties of all the sheets obtained by this procedure were then evaluated.

Bursting was measured with a Messmer Buchel M 405 burstmeter (mean of 14 measurements).

Dry tensile strength and/or tensile energy absorbed (TEA) were measured in the machine direction with a Testometric AX tensile tester (mean of 5 samples).

Wet tensile strength was measured in the machine direction with a Testometric AX tensile tester after the sample had been dipped for 20 seconds in a Finch cell filled with deionized water (mean of 5 samples).

In all the examples below, and unless otherwise indicated, the sheets of paper were prepared by the above procedure, by first introducing the cationic dry strength agent (the Hofmann rearrangement product) in a batch of 2 kg/T (dry polymer/dry fibre) followed by the anionic resin in a batch of 2 kg/T (dry polymer/dry fibre).

The tests were performed with a slurry at neutral pH.

Anionic Resin

The anionic resin used during the tests was an acrylamide and acrylic acid copolymer obtained by 15% solution polymerization as defined below.

| Anionic resin | Composition | Molar ratio | Anionicity (meq/g) | Structure | Viscosity of polymer solution (cps) |
|---|---|---|---|---|---|
| A | AM/AA | 70/30 | 3.85 | Branched (MBA) | 2500 |

Performances in Dry Strength (DSR) Application, Basis Weight 60 g/m$^2$

TABLE 1

| | Comparative test with prior art polymers | | | | | | | |
|---|---|---|---|---|---|---|---|---|
| Cationic polymer C | Determination C % | Determination A % | Dry tensile (km) | BI | TEA (J/m2) | % inc Tensile | % inc BI | % inc TEA |
| Blank | 0 | 0 | 3.070 | 1.446 | 36.191 | — | — | — |
| Ce1 | 0.2 | 0 | 3.080 | 1.490 | 36.201 | 0.3% | 3.0% | 0.0% |
| Ce1 | 0.2 | 0.2 | 3.837 | 1.910 | 44.382 | 25.0% | 32.1% | 22.6% |
| Ce2 | 0.2 | 0 | 3.085 | 1.501 | 36.403 | 0.5% | 3.8% | 0.6% |
| Ce2 | 0.2 | 0.2 | 4.010 | 1.982 | 45.675 | 30.6% | 37.1% | 26.2% |
| C3 | 0.2 | 0 | 3.115 | 1.612 | 36.318 | 1.5% | 11.5% | 0.4% |
| C3 | 0.2 | 0.2 | 4.458 | 2.115 | 53.227 | 45.2% | 46.3% | 47.1% |
| C4 | 0.2 | 0 | 3.572 | 1.785 | 43.497 | 16.4% | 23.4% | 20.2% |
| C4 | 0.2 | 0.2 | 4.397 | 2.130 | 58.448 | 43.2% | 47.3% | 61.5% |
| C5 | 0.2 | 0 | 3.227 | 1.753 | 43.210 | 5.1% | 21.2% | 19.4% |
| C5 | 0.2 | 0.2 | 4.430 | 2.150 | 58.550 | 44.3% | 48.7% | 61.8% |

% inc: Percentage increase expressed compared to blank

These results clearly show that at identical molecular weight and comparable cationic filler density (C3 compared to Ce2, C5 compared to Ce1), the dry strength properties increase when the copolymers of the invention are used.

It may also be observed that a cationic polymer of acrylamide obtained according to the invention by Hofmann rearrangement in the presence of a polyol (starch, C4) has better performance.

Remark: In Table 1, the tests were conducted within 2 days after the preparation of the cationic polymer of acrylamide.

TABLE 2

Effect of ageing on performance of the aqueous solution of cationic polymers
of acrylamide obtained by Hofmann rearrangement
The same tests as those shown in Table 1 were performed, but this time using
the polymeric solution one month after its preparation.

| Cationic polymer C | Determination C % | Determination A % | Dry tensile (km) | BI | TEA (J/m2) | % cha Traction | % cha BI | % cha TEA |
|---|---|---|---|---|---|---|---|---|
| Blank | 0 | 0 | 3.070 | 1.446 | 36.191 | — | — | — |
| Ce1 | 0.2 | 0.2 | 3.526 | 1.678 | 41.253 | −8.11% | −12.15% | −7.05% |
| Ce2 | 0.2 | 0.2 | 3.650 | 1.750 | 42.360 | −8.98% | −11.71% | −7.26% |
| C3 | 0.2 | 0.2 | 4.525 | 2.120 | 53.335 | 1.50% | 0.24% | 0.20% |
| C4 | 0.2 | 0.2 | 4.421 | 2.125 | 58.563 | 0.55% | −0.23% | 0.20% |
| C5 | 0.2 | 0.2 | 4.435 | 2.170 | 58.600 | 0.11% | 0.93% | 0.09% |

% cha: Percentage change expressed compared to the values in Table 1

The table above shows that the effect of aging of the polymer solution is pronounced for the counter-examples (Ce) whereas the performance of the aqueous solutions of cationic polymers of acrylamide obtained by the Hofmann rearrangement according to the invention are unaffected.

The invention claimed is:

1. A cationic copolymer obtained by Hofmann rearrangement in aqueous solution in the presence of an alkali and/or alkaline earth hydroxide and an alkali and/or alkaline earth hypohalide, on a base copolymer comprising:
   at least 5 mole % of a non-ionic monomer selected from the group consisting of acrylamide; methacrylamide; N,N-dimethylacrylamide; acrylonitrile; and combinations thereof; and
   at least one comonomer selected from the group consisting of unsaturated cationic ethylenic comonomer; non-ionic comonomer; and combinations thereof; and provided that the non-ionic comonomer is not acrylamide, methacrylamide, N,Ndimethylacrylamide, or acrylonitrile;
   wherein the cationic copolymer obtained in aqueous solution has a desalination coefficient (Cd) of greater than 0.6, wherein $$Cd = \frac{\text{Real polymeric active matter (in weight \%)} \times \text{Polymer filler density}}{\text{Conductivity of the solution containing 9\% of active matter.}}$$

2. The cationic copolymer according to claim 1, wherein the alkali and/or alkaline earth hypohalide/non-ionic monomer ratio (alpha coefficient) is greater than 0.5.

3. The cationic copolymer according to claim 1, wherein the alkali and/or alkaline earth hypohalide/non-ionic monomer ratio (alpha coefficient) is greater than 0.9.

4. The cationic copolymer according to claim 1, wherein the cationic copolymer is produced in a concentration higher than 8% by weight.

5. The cationic copolymer according to claim 1, wherein the cationic copolymer is produced in a concentration higher than 10% by weight.

6. The cationic copolymer according to claim 1, wherein the cationic copolymer is produced in a concentration higher than 12% by weight.

7. The cationic copolymer according to claim 1, wherein the base copolymer on which the Hofmann rearrangement is carried out has a molecular weight above 5000 g/mol.

8. The cationic copolymer according to claim 1,
   wherein the unsaturated cationic ethylenic comonomer is selected from the group consisting of dialkylaminoalkyl (meth)acrylamide monomers, diallylamine monomers, methyldiallylamine monomers, and quaternary ammonium salts or acids thereof and
   wherein the non-ionic comonomer is selected from the group consisting of N-vinyl acetamide, N-vinyl formamide, N-vinylpyrrolidone, vinyl acetate, and combinations thereof.

9. The cationic copolymer according to claim 8,
   wherein the unsaturated cationic ethylenic comonomer is a quaternary ammonium salt or acid selected from the group consisting of dimethyldiallylammonium chloride (DADMAC), acrylamidopropyltrimethylammonium chloride (APTAC), and methacrylamidopropyltrimethylammonium chloride (MAPTAC).

10. The cationic copolymer according to claim 1, wherein the base copolymer, on which the Hofmann rearrangement is conducted, comprises monomers comprising anionic fillers at a concentration of less than 5 mole % and comprises monomers of the acid or anhydride type selected from the group consisting of (meth)acrylic acid, acrylamidomethylpropane sulphonic acid, itaconic acid, maleic anhydride, maleic acid, methallyl sulphonic acid, vinyl-sulphonic acid, salts thereof, and combinations thereof.

11. The cationic copolymer according to claim 1, wherein the base copolymer, on which the Hofmann rearrangement is conducted, is branched in the presence of a branching agent, and optionally in the presence of a transfer agent; and
   wherein that the branching agent is selected from the group consisting of methylene bisacrylamide, ethylene glycol di-acrylate, polyethylene glycol dimethacrylate, diacrylamide, cyanomethylacrylate, vinyloxyethylacrylate, vinyloxyethylmethacrylate, triallylamine, formaldehyde, glyoxal, and a glycidylether type compound.

12. The cationic copolymer according to claim 11, wherein the branching agent is a glycidylether type compound selected from the group consisting of ethyleneglycol diglycidylether, epoxies, and combinations thereof.

13. The cationic copolymer according to claim 1, wherein the cationic polymer obtained has a cationic filler density higher than 3 meq/g.

14. The cationic copolymer according to claim 1, wherein the aqueous solution comprising the base polymer further comprises at least one additive having a hydroxyl function, an amine function, or combinations thereof.

15. The cationic copolymer according to claim 14, wherein the additive is selected from the group consisting of alcohols, polyols, polyosides, polyamines polyethylene imines, and combinations thereof.

16. The cationic copolymer according to claim 15, wherein the polyol is starch.

17. The cationic copolymer according to claim 1, wherein the cationic copolymer obtained in aqueous solution has a desalination coefficient (Cd) of greater than 0.65.

18. The cationic copolymer according to claim 1, wherein the cationic copolymer obtained in aqueous solution has a desalination coefficient (Cd) of greater than 0.7.

19. A method for fabricating a sheet of paper, cardboard, or paper product, comprising
   obtaining a fibrous suspension;
   adding at least two dry strength agents to the fibrous suspension before the formation of the sheet, separately or in a mixture, in any order of introduction, and the two agents are added at one or more injection points; and
   forming the sheet of paper, cardboard, or paper product;
   wherein the at least two dry strength agents comprise a first agent and a second agent, and
   the first agent is a cationic copolymer obtained by the Hofmann rearrangement of claim 1, and
   the second agent is a (co)polymer having an anionic filler density higher than 0.1 meq/g.

20. The method according to claim 19, wherein the second agent is a (co)polymer comprising 1 to 100 molar % of at least one monomer having an anionic filler, and 0 to 99 molar % of at least one monomer having a neutral or cationic filler.

21. The method according to claim 20, wherein the monomers having an anionic filler are monomers comprising:
   at least one carboxylic function selected from the group consisting of acrylic acid, methacrylic acid, salts thereof, and combinations thereof;
   at least one sulphonic acid function selected from the group consisting of 2-acrylamido-2-methylpropane sulphonique acid (AMPS), vinyl sulphonic acid, methallyl sulphonic acid, salts thereof, and combinations thereof;
   at least one non-ionic monomer selected from the group consisting of acrylamide, methacrylamide, N,N dimethylacrylamide, N-vinyl pyrrolidone, N-vinyl acetamide, N-vinyl formamide, vinylacetate, acrylate esters, allyl alcohol, and combinations thereof;
   at least one cationic monomer selected from the group consisting of dimethylaminoethyl acrylate (ADAME) quaternized or salified, dimethylaminoethyl methacrylate (MADAME) quaternized or salified, dimethyldiallylammonium chloride (DADMAC), acrylamido propyltrimethyl ammonium chloride (APTAC), methacrylamido propyltrimethyl ammonium chloride (MAPTAC), and combinations thereof; or
   combinations thereof.

22. A method for strengthening paper or coagulant, comprising
   adding a cationic copolymer obtained by the Hofmann rearrangement of claim 1 as a strengthening agent to the paper or coagulant.

23. A process for making a cationic copolymer comprising carrying out a Hofmann rearrangement in aqueous solution in the presence of an alkali and/or alkaline earth hydroxide and an alkali and/or alkaline earth hypohalide, on a base copolymer comprising:
   at least 5 mole % of a non-ionic monomer selected from the group consisting of acrylamide; methacrylamide; N,N-dimethylacrylamide; acrylonitrile; and combinations thereof; and
   at least one comonomer selected from the group consisting of unsaturated cationic ethylenic comonomer; non-ionic comonomer; and combinations thereof; and provided that the non-ionic comonomer is not acrylamide, methacrylamide, N,Ndimethylacrylamide, or acrylonitrile;
   wherein the cationic copolymer obtained in aqueous solution has a desalination coefficient (Cd) of greater than 0.6, wherein $$Cd = \frac{\text{Real polymeric active matter (in weight \%)} \times \text{Polymer filler density}}{\text{Conductivity of the solution containing 9\% of active matter.}}$$

* * * * *